United States Patent [19]

Ito et al.

[11] 4,049,867

[45] Sept. 20, 1977

[54] THERMOSETTING RESIN COMPOSITION COMPRISING AN [(2,3-EPOXYPROPOXY)ALKYL]TRIALKYLOXYSILANE

[75] Inventors: Akihiko Ito; Isao Kaetsu; Hiroshi Okubo; Masamichi Kato, all of Takasaki; Koichiro Hayashi, Suita; Yuji Maeda, Tokyo, all of Japan

[73] Assignees: Japan Atomic Energy Research Institute; Tokyo Optical Company, Ltd., both of Tokyo, Japan

[21] Appl. No.: 643,890

[22] Filed: Dec. 23, 1975

Related U.S. Application Data

[62] Division of Ser. No. 448,572, March 6, 1974, abandoned.

[30] Foreign Application Priority Data

Mar. 8, 1973 Japan .............................. 48-026594

[51] Int. Cl.$^2$ ...................... B32B 27/38; B32B 27/08
[52] U.S. Cl. .............................. 428/412; 204/159.13; 260/827; 260/46.5 UA; 260/46.5 Y; 428/413; 428/447; 428/451
[58] Field of Search ............... 428/447, 413, 451, 412; 260/827, 46.5 UA, 46.5 Y; 204/159.13

[56] References Cited

U.S. PATENT DOCUMENTS

| | | | |
|---|---|---|---|
| 3,076,726 | 2/1963 | Ault | 428/447 |
| 3,186,965 | 6/1965 | Plueddemann | 260/827 |
| 3,391,054 | 7/1968 | Lewis | 260/827 |
| 3,456,069 | 3/1976 | Kaas | 428/447 |
| 3,474,073 | 10/1969 | Higashi | 260/824 EP |
| 3,556,754 | 1/1971 | Marsden | 260/824 EP |
| 3,666,539 | 5/1972 | Kiel | 260/824 EP |
| 3,955,035 | 5/1976 | Ito | 428/447 |

*Primary Examiner*—Ellis Robinson
*Attorney, Agent, or Firm*—Ladas, Parry, Von Gehr, Goldsmith & Deschamps

[57] ABSTRACT

A novel thermosetting resin composition comprising at least one [(2,3-epoxypropoxy)alkyl]trialkoxysilane and at least one selected from polymers, prepolymers, copolymers and coprepolymers of epoxy-group-containing vinyl monomers, which may further contain at least one selected from polymers, prepolymers, copolymers and coprepolymers of vinyl monomers containing no epoxy group, is disclosed. This composition is cured by heating with addition of a ring-opening polymerization catalyst and remarkably improves surface hardness, abrasion resistance, weathering resistance, chemical resistances, heat resistances, etc. of acrylic resins and many other plastic materials without imparing the inherent transparency and other optical properties of these materials when it is applied on the surface of them and cured.

6 Claims, No Drawings

THERMOSETTING RESIN COMPOSITION COMPRISING AN [(2,3-EPOXYPROPOXY)ALKYL]TRIALKYLOXYSILANE

This is a division, of application Ser. No. 448,572 filed Mar. 6, 1974, now abandoned.

BACKGROUND OF THE INVENTION

This invention relates to a thermosetting resin composition. More particularly, it relates to a thermosetting composition which is suitable to form on the surface of plastic materials a coating that remarkably improves abrasion resistance, hardness, heat resistance, chemical resistance, weathering resistance, etc. of the plastic surface. This composition can be applied on the surface of many materials including papers and metals.

Among the plastic materials in wide use today, acrylic and methacrylic resins are superior in mechanical properties and appearance and clarity. However, these resins are defective in that they are inferior in abrasion resistance and surface hardness. As a resin that is provided with rather high abrasion resistance, diethyleneglycol bis(allyl carbonate) polymer (CR-39) is known. But the abrasion resistance and surface hardness of this resin are not quite satisfactory in practical use.

Therefore many methods for improving surface hardness of acrylic and methacrylic resins have been proposed and studied. For instance in Japanese Patent Application Publication No. 17847/60, a method is disclosed in which a cross-linking monomer such as triethyleneglycol dimethacrylate or an alkanediol dimethacrylate is applied on the inside surface of a casting mold as a film and thereafter methyl methacrylate is cast-polymerized in said mold. In Japanese Patent Application Publication No. 9827/62, another method is disclosed in which a cross-linking monomer such as allyl methacrylate, ethylene dimethacrylate, etc. is applied on the inside surface of a casting mold and a resin article which has been formed by the same mold beforehand is placed therein and the mold is heated so as to polymerize the applied monomer. In Japanese Patent Laying-Open Publication No. 26419/72, a method is disclosed in which a solution prepared by mixing a hydrolysate of an alkyl silicate such as butyl silicate and a copolymer of vinyl triethoxysilane and vinyl acetate for instance in a solvent is applied on the surface of methacrylic resin plates and the plates are heated so as to cure the applied material.

In Japanese Patent Application Publication No. 34707/70, a surface coating composition is disclosed. Said composition comprises 3 – 30% aminoplast, 0.5 – 10% an epoxy-containing alkoxysilane and the balance is a hydroxyalkyl ester of vinyl-group-containing unsaturated carboxylic acid. This composition is applied on the surface of metal plates and cured by heating.

However, all these methods and compositions are inadequate and insufficient for hardening the surface of clear and transparent plastic materials. The methods of Japanese Patent Application Publication No. 17847/60 and Japanese Patent Application Publication No. 9827/62 are unsatisfactory in that a long time is required for curing of the coating or film and the abrasion resistance of the formed coating is not sufficiently high. The coating provided by the method of Japanese Patent Application Publication No. 34707/70 is not transparent and not so hard, and therefore improvement in surface hardness and abrasion resistance of plastic materials by coating cannot be expected from this method. The method disclosed in Japanese Patent Laying-Open Publication No. 26419/72 has a fatal defect in heat resistance and weathering resistance of the formed coating. That is, the coating formed on the surface of methyl methacrylate resin wrinkles within several minutes when heated over 80° C and the inherent optical characteristics of the substrate resin are spoiled. Also this method cannot be applied to some kinds of plastic materials, for instance, this method cannot be employed for a resin such as CR-39.

In order to overcome the defects of the prior art as mentioned above, we studied the use of silicon-containing polymers as a coating for plastic materials, and discovered a composition suitable for forming a coating film on the surface of the plastics. Said composition gives a coating excellent in transparency, abrasion resistance, surface hardness, heat resistance, weathering resistance, chemical resistance and adhesion to substrate resins.

SUMMARY OF THE INVENTION

The composition of this invention comprises at least one [(2,3-epoxypropoxy)alkyl]trialkoxysilane and at least one selected from polymers, prepolymers, copolymers and coprepolymers of epoxy-group-containing vinyl monomers. The composition may further contain at least one selected from polymers, prepolymers, copolymers and coprepolymers of vinyl monomers which contain no epoxy group. Also the composition may contain a solvent for these polymers, copolymers, prepolymers or coprepolymers. The composition is cured when it is applied on the surface of a substrate resin after addition of a ring-opening polymerization catalyst and is heated.

A [(2,3-epoxypropoxy)alkyl]trialkoxysilane, the main ingredient of the composition of this invention, is represented by the general formula:

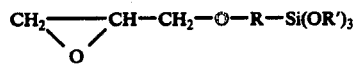

wherein R is an alkylene group containing up to 4 carbon atoms, and R' is an alkyl group containing up to 4 carbon atoms. Examples of [(2,3-epoxypropoxy)alkyl]trialkoxysilane are: [(2,3-epoxypropoxy)methyl]trimethoxysilane, [(2,3-epoxypropoxy)methyl]triethoxysilane, [(2,3-epoxypropoxy)methyl]-tripropoxysilane, [(2,3-epoxypropoxy)methyl]tributoxysilane, [2-(2,3-epoxypropoxy)ethyl]trimethoxysilane, [2-(2,3-epoxypropoxy)ethyl]triethoxysilane, [2-(2,3-epoxypropoxy)ethyl]-tripropoxysilane, [2-(2,3-epoxypropoxy)ethyl]-tributoxysilane, [3-(2,3-epoxypropoxy)propyl]trimethoxysilane, [3-(2,3-epoxypropoxy)propyl]triethoxysilane, [3-(2,3-epoxypropoxy)propyl]-tripropoxysilane, [3-(2,3-epoxypropoxy)propyl]tributoxysilane, [4-(2,3-epoxypropoxy)butyl]trimethoxysilane, [4-(2,3-epoxypropoxy)butyl]triethoxysilane, [4-(2,3-epoxypropoxy)butyl]-tripropoxysilane, [4-(2,3-epoxypropoxy)butyl]-tributoxysilane, etc. There is no limit in the chain length of the alkylene group R and the alkyl group R', since the chain lengths have no influence over the polymerization of the compound unless they are extraordinarily long. However, practically the chain length of the groups R and R' is limited to 4 carbon atoms in a normal chain. And [3-(2,3-epoxypropoxy)propyl]-trialkoxysilanes are most easily obtainable.

The above-mentioned epoxy-containing vinyl monomers used in combination with the [(2,3-epoxypropoxy)alkyl]-trialkoxysilane is a vinyl monomer that contains at least one epoxy group in its molecule and the specific examples thereof are: glycidyl methacrylate and acrylate, 3,4-epoxybutyl methacrylate and acrylate, 4,5-epoxypentyl methacrylate and acrylate, etc. This monomer is used in an amount 1 to 99% by weight, preferably 50 to 2% by weight, and most preferably 20 to 5 % by weight of the composition excluding solvent.

Specific examples of the vinyl monomer containing no epoxy group that are to be used in combination with [(2,3-epoxypropoxy)alkyl]trialkoxysilane are: methacrylic and acrylic acid esters such as methyl methacrylate and acrylate, ethyl methacrylate and acrylate, propyl methacrylate and acrylate, butyl methacrylate and acrylate; styrene, vinyl acetate, etc. This monomer is used in an amount of 0 to 10 % by weight, preferably 0.01 to 5 % by weight, and more preferably 0.1 to 2% by weight of the composition excluding solvent.

The composition of this invention can be applied to the surface of plastic substrates. The term "plastic substrates" used herein means items or articles of all kinds of the known synthetic resins. Specific examples of such synthetic resins are: polymers or copolymers of methacrylic acid esters and/or acrylic acid esters (e.g. poly(methylmethacrylate)), polystyrene copolymers of styrene and acrylonitrile, poly(vinyl chloride), polymers of diethyleneglycol bis(allyl carbonate), polycarbonates, polyesters, cellulose nitrate, cellulose acetate, poly(vinyl alcohol), etc. This composition can be applied on the surface of metals, paper, finished photographic films and papers.

The composition of this invention exhibits excellent effect when it is applied on the surface of articles of highly transparent synthetic resins. The coating resulting from this composition remarkably improves the surface properties of the substrate without impairing inherent optical properties of the substrate resin.

The composition of this invention can be prepared by mixing at least one [(2,3-epoxypropoxy)alkyl]trialkoxysilane and at least one epoxy-containing vinyl monomer, or these two and at least one non-epoxy vinyl monomer and then polymerizing or copolymerizing said mixture to a predetermined extent by addition of a radical polymerization initiator or by means of an ionizing radiation. Or else, the composition can be prepared by mixing at least one [(2,3-epoxypropoxy)-alkyl]trialkoxysilane and at least one prepolymer or polymer of the above-mentioned epoxy-containing vinyl monomers or at least one coprepolymer or copolymer of said monomer and the above-mentioned non-epoxy vinyl monomer, which have been prepared beforehand, and further a solvent for said prepolymer, coprepolymer, polymer or copolymer may be added if necessary.

Although the fact that [(2,3-epoxypropoxy)alkyl]-trialkoxysilane is a good solvent for the above-explained prepolymer, coprepolymer, polymer or copolymer is very convenient, it is practical to add a solvent for said prepolymer, coprepolymer, polymer or copolymer. Generally a vinyl monomer has solvent power for its own polymerized product. Therefore, it is suitable to use the corresponding monomer as the solvent for the prepolymer, coprepolymer, polymer or copolymer. However, an inherent solvent such as chloroform, acetone, methylethyl ketone, methylisobutyl ketone, tetrahydrofuran, p-dioxane, ethyl acetate, etc. may be used.

The thus obtained composition is cured by adding thereto a ring-opening polymerization catalyst, for instance, a Lewis acid such as $BF_3$, $SnCl_4$, $FeCl_2$, $SbCl_5$, $SbCl_3$, $ZnCl_2$, etc.; a complex of any of these compounds and an oxygen-containing organic compound such as ethyl ether; a protonic acid such as HCl, HBr, HI, $H_2SO_4$, carboxylic acids, sulfonic acid, $HClO_4$, etc. preferably dissolved in a suitable solvent, in an amount of 0.01 to 3 % by weight of the composition and heating the composition.

As the ring-opening polymerization catalyst does not function as the catalyst at ordinary temperature, it can be mixed with the composition of this invention in advance to use thereof. Therefore, the composition of this invention can be prepared by adding a ring-opening polymerization catalyst to the mixture of a least one [(2,3-epoxypropoxy)-alkyl]trialkoxysilane and at least one epoxy-containing vinyl monomer or these two and at least one non-epoxy vinyl monomer in advance, and irradiating the mixture at room temperature or a temperature lower than that.

It is possible to control viscosity of the composition of this invention by addition of a solvent such as chloroform, acetone, methylethyl ketone, methylisobutyl ketone, tetrahydrofuran, p-dioxane, ethyl acetate, etc. so that the composition may have a suitable viscosity for a coating operation to be employed. Any of brush coating, spray coating, dip coating, etc. can be employed according to the shape of substrate resin articles, usage of the articles, etc. Also, the coating can be effected by directly applying the composition on the inside surface of a casting mold and heating it so as to cure it partly or wholly, and thereafter pouring into the mold the monomer of the substrate resin (polymer) so as to polymerize it therein. Alternately, the coating can be effected by directly applying the composition on the inside surface of the mold and placing in the mold the substrate resin article which has been formed by the same mold beforehand and heating the mold so that the composition is cured to form a coating on the article.

Hardening of the composition which has been applied to the substrate can be effected by heating at a temperature between 20° and 200° C, preferably 50° and 150° C, and more preferably 60° and 120° C. The time necessary for curing the composition ranges from several minutes to several hours in accordance with the temperature employed. Once-formed, the coating is stable even if it is heated at 150° C for several hours, and the coating is excellent in transparency, chemical resistance, weathering resistance, abrasion resistance, surface hardness, heat resistance, etc.

The reason why the combination of [(2,3-epoxypropoxy)-alkyl]trialkoxysilane and epoxy-containing vinyl polymer gives excellent abrasion resistance, surface hadness, heat resistance, chemical resistance, weathering resistance, adhesion to the plastic substrate, etc. is considered as follows. The epoxy-containing alkoxysilane and the epoxy-containing vinyl monomer copolymerize themselves by epoxy groups to form strong bonds and the strength of these bonds is enhanced by the toughness resulting from vinyl polymerization.

DETAILED DESCRIPTION OF PREFERRED EMBODIMENTS

The invention is now illustrated by way of working examples. But it must be understood that these embodiments are only exemplary and the invention is never to be limited to these specific embodiments. Various modifications and changes can be made within the spirit and scope of this invention as defined in the attached claims.

In these examples, performance of the products of this invention was tested according to the procedures given below.

Abrasion resistance of the formed coating films was tested in accordance with the sand falling method (ASTM D968-51), and the ratio of light transmittance after abrasion to light transmittance before abrasion was given in %.

Surface hardness was tested by the method of JIS K5651, which is as follows.

The lead of a standard test pencil is exposed in the length of 3 mm without sharpening, the end surface of the exposed cylindrical lead is whetted flat on sand paper so that the circular peripheral edge of the end surface becomes sharp. The thus prepared pencil is positioned slant at the angle of 45° to the surface of a specimen to be tested. The end of the pencil lead is loaded with 1 kg, and the specimen is moved horizontally. The same test is repeated 5 times in different places on the surface. If scratches or break of the coating reaching the substrate is observed in two or more of 5 runs, the test is repeated with a pencil of one grade lower hardness. The hardness of the pencil, with which scratch is observed in less than 2 runs out of 5 runs, is indicated as the hardness of the tested specimen.

Adhesion of the film coating to the substrate material was tested by the following peal-off test method. A small grid-like pattern comprising 100 small 1 mm × 1 mm squares was provided on the surface of the coated film by using a razor blade to cut straight lines crosswise with 1 mm space therebetween deep enough to reach the substrate. Then a strip of cellophane adhesive tape was stuck onto the thus provided grid pattern and then the tape was jerked up in the direction perpendicular to the grid surface. And the number of the small squares of the film remaining was counted. A count of 100 means there was no peel-off.

In these examples parts mean those by weight if not specifically defined.

EXAMPLE 1

Eighty parts of [3-(2,3-epoxypropoxy)propyl]trimethoxysilane was mixed with 20 parts of glycidyl methacrylate, and the mixture was irradiated with gamma rays from cobalt-60 at a dose rate of $1 \times 10^6$ R/hr for 2 hours at room temperature. To the thus obtained viscous liquid, a catalyst solution consisting of 0.3 part of perchloric acid and 20 parts of chloroform-acetone mixture (1 : 1 by volume) was admixed at 0° C.

This composition was applied onto the surface of a CR-39 resin (diethyleneglycol bis-(allyl carbonate)-polymer) plate by dipping, and the composition was cured by heating it in an air bath kept at 100° C for 1.5 hours. The formed hard film coating was clear and transparent and did not impair the inherent optical characteristics of CR-39 resin. This film coating was scarcely scratched even when it was rubbed hard with steel wool. The result of the peel-off test was 100; that is, there was no peel-off. Pencil hardness was 6H. The result of the abrasion test is shown in Table 1.

EXAMPLE 2

A mixture of 80 parts of [3-(2,3-epoxypropoxy)-propyl]-trimethoxysilane, 18 parts of glycidyl methacrylate, 2 parts of methyl methacrylate and 2 parts of 4,5-epoxypentyl methacrylate was irradiated with gamma rays from cobalt-60 at a dose rate of $1 \times 10^6$ R/hr for 2 hours. To the thus obtained viscous liquid, a solution prepared by dissolving 0.3 part of $BF_3$ in 20 parts of ethyl ether was added and mixed at 0° C.

The thus obtained composition was applied to the surface of a glycidyl methacrylate-ethyl acrylate copolymer plate by spraying, and was heated in air bath of 100° C for 2 hours. Thus a clear transparent film coating was formed. The pencil hardness thereof was 6H. Almost no scratch or streak was observed when it was rubbed hard with steel wool. The result of the peel-off test was 100. The result of the abrasion test is shown in Table 1.

EXAMPLE 3

Six hundred and forty parts of benzene, 360 parts of glycidyl methacrylate and 0.5 part of azo bis-isobutyronitrile were mixed in a flask equipped with a stirrer, and the mixture was heated at 60° C for 8 hours for reaction. Thereafter, the reaction mixture was poured into 5,000 parts of ethyl ether so as to precipitate the formed glycidyl methacrylate polymer. By washing the precipitate polymer with ethyl ether and drying, 100 parts of glycidyl methacrylate polymer was obtained in the state of white powder.

A mixture of 18 parts of the thus obtained polymers and 5 parts of glycidyl methacrylate was admixed with 80 parts of [3-(2,3-epoxypoxy)propyl]trimethoxysilane. By agitation, the polymer was completely dissolved and a viscous solution was obtained. A catalyst solution prepared by dissolving 0.3 part of perchloric acid in 20 parts of a chloroformacetone mixture (1 : 1 by volume) was added to the viscous solution at 0° C.

The thus obtained composition was applied on the surface of a CR-39 resin plate by spraying, and the plate was heated at 110° C for 1 hour. A clear transparent film coating was formed. The pencil hardness of the coating was 6H. No scratches or streaks were observed even after it was rubbed hard with steel wool. The result of the abrasion test is shown in Table 1.

EXAMPLE 4

A mixture of 80 parts of [3-(2,3-epoxypropoxy)-propyl]-trimethoxysilane, 20 parts of glycidyl methacrylate, 0.5 part of styrene and 1 part of ethyl acrylate was irradiated with gamma rays from cobalt—60 at the dose rate of $2 \times 10^6$ R/hr for 1 hour at room temperature. A viscous composition was obtained, to which a solution of 0.5 part of perchloric acid in 10 parts of a chloroform-acetone mixture (1 : 1 by volume) was admixed.

The composition was applied on the surface of a CR-39 resin plate by dipping, and the plate was heated at 100° C for 10 hours so as to harden the applied film coating. The thus formed film coating was clear and transparent, and was so hard that almost no scratch was caused even after it was rubbed hard with steel wool. The result of the peel-off test was 100 and the result of the abrasion test is shown in Table 1.

EXAMPLE 5

A mixture of 99 parts of glycidyl methacrylate and 1 part of [3-(2,3-epoxypropoxy)propyl]trimethoxysilane was irradiated with gamma rays from cobalt-60 at a dose rate of 3 × 10⁶ R/hr for 1 hour at room temperature. After the irradiation, a solution of 0.15 part of perchloric acid in 10 parts of a chloroform-acetone mixture (1 : 1 by volume) was admixed to the mixture.

The thus obtained composition was applied on the surface of a poly(glycidyl methacrylate) resin plate by dipping and was cured by heating it at 150° C for 5 hours. A transparent uniform film coating was formed. The pencil hardness of the coating film was 9H. The result of the peel-off test was 100. The result of abrasion test is shown in Table 1.

In this example only 1 percent of the epoxy-containing alkoxysilane was used. Therefore the abrasion resistance of the resulting film is far lower than the products of the other examples as shown in Table 1. However, the abrasion resistance is still far higher than that of the uncoated poly(glycidyl methacrylate) resin plate used as a control (See the table), and considerably higher than that of a poly(methyl methacrylate) plate.

EXAMPLE 6

Prepolymer of glycidyl methacrylate was prepared by heating 100 parts of glycidyl methacrylate containing 0.5 part of azo-bis-isobutyronitrile in a flask equipped with a stirrer at 70° C for 1 hour in a nitrogen atmosphere.

To this prepolymer, a solution of 0.8 part of perchloric acid in 20 parts of a chloroform-acetone mixture (1 : 1 by volume) was added at 0° C under agitation. To 20 parts of this mixture, 80 parts of [3-(2,3-epoxypropoxy)-propyl]trimethoxysilane was added and mixed at 0° C.

The thus obtained composition was applied on the surface of acrylonitrile-styrene copolymer resin by dipping, and heated at 100° C for 1 hour and further at 60° C for 8 hours in an air bath. The formed clear transparent film coating had a pencil hardness of 6H. The result of the abrasion test is shown in Table 1.

EXAMPLE 7

A mixture of 800 parts of [3-(2,3-epoxypropoxy)-propyl]-trimethoxysilane, 20 parts of glycidyl methacrylate, and 1 part of benzoyl peroxide was heated in a flask equipped with a stirrer for reaction at 70° C for 2.5 hours in a nitrogen atmosphere, and a viscous composition was obtained. The composition was cooled to 0° C, and a solution of 0.3 part of perchloric acid in 20 parts of a chloroform-acetone mixture (1 : 1 by volume) was added thereto.

The thus prepared composition was applied on the surface of a CR-39 resin plate by dipping, and was heated at 100° C for 2 hours in an air bath. A clear transparent film coating was formed, and its pencil hardness was 6H. The result of the peel-off test was 100. When the coated resin plate was boiled in water for 2 hours, no change was observed. The result of the abrasion test is shown in Table 1.

EXAMPLE 8

Eighty parts of [3-(2,3-epoxypropoxy)propyl]triethoxysilane, 10 parts of glycidyl methacrylate, 10 parts of glycidyl acrylate and a solution of 0.3 part of perchloric acid in 25 parts of a chloroform-acetone mixture (1 : 1 by volume) were mixed at 0° C, and was irradiated with gamma rays from cobalt-60 at a dose rate of 5 × 10⁵ R/hr for 4 hours at 0° C. Thus a viscous composition (about 10C cp) was obtained.

This composition was applied to the surface of a poly(methyl methacrylate) resin plate by dipping. The plate was heated at 100° C, and further at 60° C for 5 hours, and a transparent and uniform film coating was formed, the pencil hardness of which was 6H. The result of the abrasion test is shown in Table 1. For the purpose of heat resistance test, the thus coated plate was paced in an air bath kept at 120° C for 30 minutes. But no wrinkling, peeling-off or cracking was observed and the inherent optical characteristics were not impaired.

EXAMPLE 9

A mixture of 80 parts of [3-(2,3-epoxypropoxy)-propyl]-tripropoxysilane and 20 parts of glycidyl methacrylate was irradiated with gamma rays from cobalt-60 at a dose rate of 1 × 10⁶ R/hr for 2 hours at room temperature. A viscous liquid was obtained, to which a solution of 0.3 part of perchloric acid in 20 parts of a chloroform-acetone mixture (1 : 1 by volume) was added at 0° C.

The thus obtained composition was applied to the surface of a CR-39 resin plate by dipping, and was cured by heating at 100° C in an air bath for 1.5 hours. The formed hard coating film was transparent and did not impair the optical characteristics of CR-39 resin. The coating film was rubbed hard with steel wool, but almost no scratch or streak was observed. The result of the peel-off test was 100. The pencil hardness was 7H. The result of the abrasion test is shown in Table 1.

Table 1

| Samples | | Abrasion Resistance |
|---|---|---|
| Product of Example | 1 | 62.3 % |
| | 2 | 63.0 |
| | 3 | 64.5 |
| | 4 | 61.5 |
| | 5 | 27.6 |
| | 6 | 62.3 |
| | 7 | 62.8 |
| | 8 | 61.5 |
| | 9 | 65.2 |
| Ordinary glass plate | | 73.8 |
| CR-39 resin plate | | 35.5 |
| Poly(methyl methacrylate) plate | | 17.2 |
| Poly(glycidyl methacrylate) plate | | 9.5 |

Abrasion resistance =

$$\frac{\text{Light transmittance before sand abrasion}}{\text{Light transmittance after sand abrasion}} \times 100$$

What we claim is:

1. A resin composite comprising a plastic substrate and a cured, abrasion resistant, transparent coating formed from a thermosetting resin composition comprising:
   a. at least one [(2,3-epoxypropoxy)alkyl] trialkoxysilane represented by a general formula:

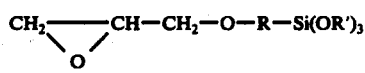

whereby R is an alkylene group containing up to 4 carbon atoms and R' is an alkyl group containing up to 4 carbon atoms, and
   b. at least one selected from the group consisting of polymers and copolymers of epoxy-group containing vinyl monomers selected from the group consisting of glycidyl acrylate, 3,4-epoxybutyl methacrylate, 3,4-epoxybutyl acrylate, 4,5-epoxypentyl methacrylate and 4,5-epoxypentyl acrylate, which coating is cured by heating with addition of a ring-opening polymerization catalyst and wherein (b) amounts to 2 to 50% by weight of the total of components (a) and (b).

2. A resin composite as set forth in claim 1, which comprises a substrate of a plastic resin selected from the groups consisting of polymers and copolymers of methacrylic acid esters and acrylic acid esters, poly(vinyl chloride), polymers of diethyleneglycol bis(allyl carbonate), polycarbonates, polymers and copolymers of styrene and acrylonitrile, polyesters, cellulose nitrate, cellulose acetate and poly(vinyl alcohol); and said coating formed from said thermosetting resin composition wherein the R of the general formula is selected from the group consisting of methylene, ethylene and trimethylene, and R' is selected from the group consisting of methyl, ethyl, n-propyl and n-butyl, and wherein the composition further contains a catalytic amount of a catalyst selected from the group consisting of a Lewis acid, complex of a Lewis acid and an oxygen-containing organic compound, and a protonic acid as the ring-opening polymerization catalyst.

3. A resin composite as set forth in claim 1, which comprises a plastic resin substrate and a coating formed form said thermosetting resin composition which further contains (c) a vinyl monomer selected from the group consisting of lower alkyl methacrylates, lower alkyl acrylates, styrene and vinyl acetate, in an amount of up to 10% by weight of the total components (a), (b) and (c).

4. A resin composite as set forth in claim 2, wherein said catalyst is selected from the group consisting of $BF_3$, $SnCl_4$, $SbCl_5$, $SbCl_3$, $ZnCl_2$, a complex of one of these compounds and ethyl ether, HCl, HBr, HI, $H_2SO_4$, a carboxylic acid, sulfonic acid and $HClO_4$, and wherein said composition further contains (c) a vinyl monomer selected from the group consisting of lower alkyl methacrylates, lower alkyl acrylates, styrene and vinyl acetate, in an amount of up to 10% by weight of the total components (a), (b) and (c).

5. A resin composite as set forth in claim 1, which comprises a substrate of a plastic resin selected from the group consisting of polymers and copolymers of methacrylic acid esters and acrylic acid esters, diethyleneglycol bis(allyl carbonate), polymers and copolymers of styrene and acrylonitrile; and said coating formed from said thermosetting resin composition which contains: (a) a [(2,3-epoxypropoxy)propyl]trialkoxy-silane, (b) one of said polymers and copolymers of glycidyl acrylate, (d) a catalytic amount of a ring-opening catalyst selected from the group consisting of $HClO_4$ and $BF_3$, and (e) a solvent consisting of a mixture of chloroform and acetone and wherein component (b) amounts to 5 – 20% by weight of the total components (a) and (b).

6. A resin composite as set forth in claim 5, wherein said composition further contains (c) a vinyl monomer selected from the group consisting of methyl methacrylate, styrene and vinyl acetate, and wherein component (c) amounts to 0.1 – 2% by weight of the total of components (a), (b) and (c).

* * * * *